United States Patent
Raghavan

(10) Patent No.: US 6,213,909 B1
(45) Date of Patent: Apr. 10, 2001

(54) MULTI-SPEED POWER TRANSMISSION WITH A MECHANICAL CLUTCH

(75) Inventor: Sekhar Raghavan, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/411,081

(22) Filed: Oct. 4, 1999

(51) Int. Cl.⁷ ...................................................... F16H 3/44
(52) U.S. Cl. ........................................... 475/282; 475/303
(58) Field of Search .................................. 475/282, 298, 475/303

(56) References Cited

U.S. PATENT DOCUMENTS

| | | | |
|---|---|---|---|
| 2,584,468 | * 2/1952 | Kelbel | 475/282 |
| 2,896,479 | * 7/1959 | Kelbel | 475/303 X |
| 4,430,908 | * 2/1984 | Stockton | 475/55 |
| 5,447,478 | * 9/1995 | Braun | 475/282 |
| 5,692,988 | * 12/1997 | Beim et al. | 475/286 X |
| 5,716,298 | * 2/1998 | Beim et al. | 475/281 X |
| 5,755,636 | * 5/1998 | Justice et al. | 475/286 X |
| 5,885,182 | * 3/1999 | Forsyth | 475/198 |
| 5,980,418 | * 11/1999 | Park | 475/275 |
| 6,007,450 | * 12/1999 | Raghavan et al. | 475/286 |
| 6,071,208 | * 6/2000 | Koivunen | 475/282 X |

FOREIGN PATENT DOCUMENTS

3330303 * 3/1985 (DE) ..................................... 475/303

* cited by examiner

Primary Examiner—Charles A. Marmor
Assistant Examiner—Roger Pang
(74) Attorney, Agent, or Firm—George A. Grove

(57) ABSTRACT

A powertrain has a multi-speed power transmission incorporating two planetary gear sets, four friction mechanisms and a selectively operable mechanical drive connection that are controlled to provide five forward speed ratios, a neutral condition and a reverse speed ratio. The mechanical drive connection is disposed to interconnect two members of the planetary gear sets during forward drive conditions and to connect one of the members with an input shaft during the reverse speed ratio. The mechanical drive connection is disconnected from all members during the neutral condition. Two of the friction mechanisms are clutches, one of which is selectively engageable to interconnect two members of the planetary gear sets, and the other of which is selectively engageable to connect the input shaft with a member of one of the planetary gear sets. The other two friction mechanisms are selectively engageable brakes that are effective to establish reaction members in the planetary gear sets.

3 Claims, 1 Drawing Sheet

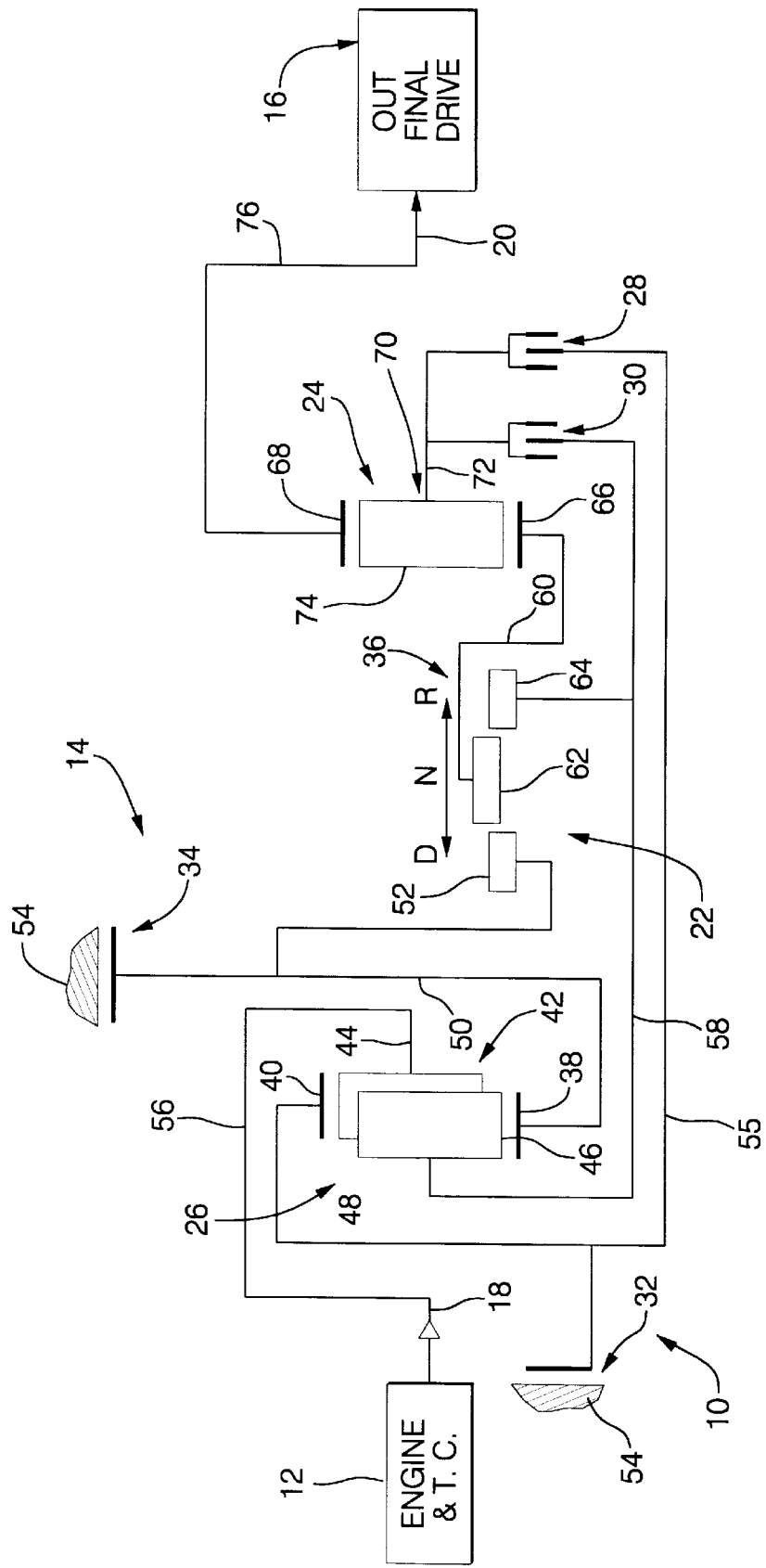

MULTI-SPEED POWER TRANSMISSION WITH A MECHANICAL CLUTCH

TECHNICAL FIELD

This invention relates to multi-speed power transmissions and more particularly to such transmissions employing a forward/reverse clutch mechanism.

BACKGROUND OF THE INVENTION

Vehicle powertrains incorporate a multi-speed, automatic shifting power transmission to increase the effectiveness of the operating range of the internal combustion engine to provide for improved fuel economy and more efficient highway speed operation. The number of forward gear ratios available through the transmission has increased from two to five. The increased number of gear ratios requires an increased size and number of components at the transmission.

Many of the currently-available automatic shifting transmissions incorporate two or three planetary gear sets that are interconnected either directly or through friction devices to provide the desired gear ratios. The number of mechanical members increases with the number of gear ratios. Generally, an added gear ratio requires at least one additional friction device with the accompanying complexity in the control function. The added friction device (either a clutch or a brake) requires a plurality of friction plates, a piston, and return springs. These items require an increase in assembly time for the transmission. In the case of an added clutch, a housing must be provided, and a means for insuring against "centrifugal drift on" is necessary. In the case of a brake, additional machining in the transmission housing is required.

SUMMARY OF THE INVENTION

It is an object of the present invention to provide an improved five-speed planetary transmission having a forward/reverse mechanical clutch. In one aspect of the present invention, a powertrain has a planetary transmission including two planetary gear sets selectively interconnectable through a mechanical clutch. In another aspect of the present invention, one of the planetary gear sets is a simple planetary gear set having a sun gear member that is connectable with a sun gear of the other planetary gear set or the transmission input shaft through the mechanical clutch.

In yet another aspect of the present invention, the other planetary gear set is a compound planetary gear set having a carrier assembly member continually connected with the transmission input shaft and selectively connectable with the sun gear of the simple planetary gear set. In still another aspect of the present invention, the sun gears of both planetary gear sets are selectively connectable to a stationary housing through a brake when the mechanical clutch is interconnecting them. In a further aspect of the present invention, the mechanical clutch connects the sun gear of the simple planetary gear set with the input shaft during reverse operation, to the other sun gear during all forward operations and has a neutral position during a transmission neutral condition.

BRIEF DESCRIPTION OF THE DRAWINGS

The drawing is a schematic representation of a powertrain incorporating the present invention.

DESCRIPTION OF AN EXEMPLARY EMBODIMENT

A powertrain 10 has an engine and torque converter 12, a power transmission 14, and a final drive gearing 16. The engine and torque converter 12 are conventional devices that are commonly used with automatic shifting power transmissions. The final drive gearing is a conventional mechanism that can include a conventional differential gear unit to distribute power to the driven wheels of a vehicle, not shown.

The power transmission 14 has an input shaft 18 connected with the engine and torque converter 12, an output shaft 20 connected with the final drive gearing 16 and a planetary gear arrangement 22. The planetary gear arrangement 22 includes a simple planetary gear set 24, a compound planetary gear set 26, a pair of selectively engageable friction clutches 28 and 30, a pair of selectively engageable friction brakes 32 and 34, and a mechanical clutch 36. The friction clutches 28 and 30 are preferably conventional fluid-operated disc-type torque transmitting mechanisms. The friction brakes are preferably conventional fluid-operated torque transmitting mechanisms of either the disc type or band type. The mechanical clutch is a conventional positive contact torque transmitting mechanism having interlocking engaging surfaces that provide a rigid mechanical connection such as a jaw clutch or a dog clutch.

The compound planetary gear set 26 has a sun gear member 38, a ring gear member 40 and a carrier assembly member 42. The carrier assembly member 42 includes a planet carrier 44 on which is rotatably mounted a plurality of pinion gear members 46 disposed in meshing relation with the sun gear member 38 and another plurality of pinion gear members 48 that are disposed in meshing relation with the ring gear member 40.

The sun gear member 38 is connected to a hub 50 that is drivingly connected with a clutch member or portion 52 of the mechanical clutch 36 and operatively connected with the brake 34. The brake 34 is operatively connected with a stationary transmission housing 54. The carrier assembly member 42 is drivingly connected with the input shaft 18 through a hub 56. The ring gear member 40 is operatively connected with the brake 32, which is connected with the housing 54, and to a sleeve shaft 55 that is connected with the clutch 28.

The carrier assembly member 42 is continually driven by the engine during vehicle operation. The planet carrier assembly member 42 is also connected to a sleeve shaft 58 which is in turn connected with the clutch 30. The sun gear member 38 is held stationary by the brake 54, when engaged, and drivingly connected to a hub 60 when a clutch control sleeve 62 of the clutch 36 is moved to the left position D. The brake 32, when engaged, will hold the ring gear member 40 stationary. The mechanical clutch has a clutch member 64 that is secured to the sleeve shaft 58 such that, when the clutch control sleeve 62 is moved to the right position R, the hub 60 will rotate in unison with the input shaft 18. When the control sleeve is in the center position N, the control sleeve 62 engages neither hub clutch member 52 nor 64.

The hub 60 and therefore the clutch sleeve 62 are connected with a sun gear member 66 which is a member of the simple planetary gear set 24. The simple planetary gear set 24 also includes a ring gear member 68 and a carrier assembly member 70. The carrier assembly member 70 has a carrier 72 on which is rotatably mounted a plurality of pinion gear members 74 that are disposed in meshing relation with both the sun gear member 66 and the ring gear member 68.

The ring gear member 68 is continually drivingly connected with the output shaft 20 through a hub 76. The carrier assembly member 70 is connected with both clutches 28 and 30. When the clutch 28 is engaged, the carrier assembly member 70 is connected with the brake 32 and with the ring gear member 40. When the clutch 30 is engaged, the carrier assembly member 70 is connected for unitary rotation with the input shaft 18.

The power transmission 14 will provide five forward speed ratios, a neutral condition and a reverse ratio through the judicious selection of the clutches 28 and 30, the brakes 32 and 34, and the positioning of the clutch sleeve 62. When the clutch sleeve 62 is moved to the R position and the clutch 28 and the brake 32 are engaged, the transmission 14 is conditioned for reverse operation. When the input shaft 18 is rotated forwardly by the engine and torque converter 12, the output shaft 20 will rotate in reverse. During reverse operation, the sun gear member is driven forwardly by the input shaft 18 through the hub 56, the sleeve shaft 58 and the mechanical clutch 36; the carrier assembly member 70 is held stationary through the cooperation of the brake 32 and the clutch 28; and the ring gear 68 is driven in reverse at a ratio relative to the input shaft determined by the ratio of the simple planetary gear set 24.

To condition the transmission 14 for the neutral condition, the clutch sleeve 62 is moved to the central position N. When the mechanical clutch 36 is conditioned in this manner, the planetary gear set 24 does not have a reaction member and therefore the output shaft 20 cannot receive power from the input shaft 18. If the input shaft 18 is rotating, and the clutch 28 and brake 32 are engaged, the sun gear is free to rotate and therefore cannot provide the needed input to the planetary gear set 24 such that an output cannot be attained.

To condition the transmission 14 for forward operation, the clutch control sleeve 62 is moved to the D position, thereby connecting the sun gear 66 with the hub 50. To provide the first and lowest forward ratio, the brake 32 and the clutch 28 are engaged. It will be appreciated that these friction devices are engaged for reverse also and can be engaged in neutral as well. Thus, a shift from neutral to either forward or reverse drive is completed by the position selection of the clutch control sleeve 62. With the vehicle brakes engaged and the engine at an idle condition, only a small amount of torque is available such that the mechanical clutch 36 is engaged under very light loads. The torque capacity of the brake 32 can be reduced, by electronic controls, during the transition of the clutch 36 between reverse and first and vice-versa. This will reduce the torque transmitted by the clutch during the transition and provide for a smoother disengagement and engagement. With the transmission 14 conditioned for the first ratio, the sun gear members 38 and 66 are rotated opposite to the input shaft 18 by the action of the compound planetary gear set 26. The carrier assembly member 70 is held stationary and therefore the ring gear member 68 and the output shaft 20 are driven forwardly at a reduced ratio determined by the ratios of both of the planetary gear sets.

To establish the second forward speed ratio, the brakes 32 and 34 are interchanged while the mechanical clutch 36 and the clutch 28 remain engaged. The interchange of the brakes 32 and 34 changes the reaction member of the simple planetary gear set 24 from the carrier assembly member 70 to the sun gear member 66 and also establishes the sun gear member 38 as a reaction member in the compound planetary gear set 26. The ring gear 40 is driven forwardly at a ratio determined by the compound planetary gear set 26 as is the carrier assembly 70. The ring gear member 68 is driven forwardly at a ratio determined by the simple planetary gear set 24. Thus, the second forward ratio is determined by both planetary gear sets 24 and 26.

To establish the third forward ratio, the brake 34 and the clutch 30 are interchanged while the mechanical clutch 36 and the clutch 28 remain engaged. This engagement pattern creates a direct drive in the planetary gear sets 24 and 26 such that the input shaft 18 and the output shaft 20 rotate in unison.

To establish the fourth speed forward ratio, the clutch 28 and the brake 34 are interchanged while the mechanical clutch 36 and the clutch 30 remain engaged. This establishes the sun gear member 66 as a reaction member in the simple planetary gear set 24 and the carrier assembly member 70 as an input member in the simple planetary gear set 24. This establishes an overdrive ratio in the simple planetary gear set 24 between the input shaft 18 and the output shaft 20.

To establish the fifth and highest forward speed ratio, the brakes 34 and 32 are interchanged. This establishes the ring gear member 40 as a reaction member in the compound planetary gear set 26, resulting in a reduced reverse rotation of the sun gear members 38 and 66. The forward rotation of the carrier assembly member 70 results in an overdrive ratio at the ring gear member 68 that produces a higher output speed for a given input speed than is available in the fourth forward ratio. The fifth forward speed ratio is dependent on the ratios of both of the planetary gear sets.

The engagement and disengagement of the brakes 32 and 34, the clutches 28 and 30, and the mechanical clutch 36 can be controlled by many of the well-known electro-hydraulic control systems. As is well known to those skilled in the are, these control systems generally employ an electronic control module that includes a preprogrammed digital computer to establish the shift interchange points from various input signals such as engine speed, available torque, output speed, and throttle setting, to name a few.

The following truth table provides an example of the ratios that are available with a transmission as described above.

| Gear | Ratio | Clutch 36 | Clutch 28 | Clutch 30 | Brake 32 | Brake 34 |
|---|---|---|---|---|---|---|
| Rev | −2.18 | R | X | | X | |
| Neutral | | N | X | | X | |
| 1$^{st}$ | 2.99 | D | X | | X | |
| 2$^{nd}$ | 1.62 | D | X | | | X |
| 3$^{rd}$ | 1.00 | D | X | X | | |
| 4$^{th}$ | 0.69 | D | | X | | X |
| 5$^{th}$ | 0.56 | D | | X | X | |

X = engaged, D = forward position, R = reverse position, N = neutral position. The overall ratio spread (1$^{st}$ to 5$^{th}$) is 5.36.

In the above table, the ratio of ring gear member 40 to sun gear member 38 (R/S) is 1.73, and the ratio of ring gear member 68 to sun gear member 66 (R/S) is 2.18. It will be obvious from the above table that all of the normal interchanges are of the single transition type ratio changes and all of the double step or skip shift interchanges (i.e. 1$^{st}$ to 3$^{rd}$) are also single transition type ratio changes.

What is claimed is:

1. A powertrain having a power source and transmission comprising:

an input shaft for delivering power between said power source and the transmission;

an output shaft for delivering power from the transmission;

a compound planetary gear set having a carrier assembly member including a plurality of pairs of intermeshing pinion gear members, said carrier assembly member being continuously connected with said input shaft, a sun gear member meshing with one of the pinion gear members in each pair, and a ring gear member meshing with the other of the pinion gear members in each pair;

a simple planetary gear set having a ring gear member continuously connected with said output shaft, a sun gear member, and a carrier assembly member including a plurality of pinion gear members meshing with both said ring gear member and said sun gear member;

a first torque transmitting mechanism selectively connectable between said simple planetary carrier assembly member and said compound planetary ring gear member;

a second torque transmitting mechanism selectively connectable between said simple planetary carrier assembly member and said input shaft;

a third torque transmitting mechanism selectively connectable between said compound planetary ring gear member and a stationary housing;

a fourth torque transmitting mechanism selectively connectable between said compound planetary sun gear member and said stationary housing; and a mechanical clutch having first portion connected with said compound planetary sun gear member and said fourth torque transmitting mechanism, a second portion connected with said second torque transmitting mechanism, and a clutch control portion continuously, drivingly connected with said simple planetary sun gear and selectively connectable with said first and second portions individually.

2. The powertrain having a power source and transmission defined in claim 1 further comprising:

said clutch control portion being connected with said first portion during five forward speed ratios, with said second portion during a reverse speed ratio, and disconnected from both portions during a neutral condition.

3. A powertrain having a power transmission comprising:

an input shaft;

an output shaft;

a transmission housing;

a first selectively engageable rotating torque transmitting mechanism connected with said input shaft;

a second selectively engageable rotating torque transmitting mechanism;

a first selectively engageable stationary torque transmitting mechanism operatively connected with said transmission housing;

a second selectively enageable stationary torque transmitting mechanism operatively connected with said transmission housing;

a compound planetary gear set having a first member continuously drivingly connected with said input shaft, a second member operatively connected with said second selectively engageable rotating torque transmitting mechanism and said first selectively engageable stationary torque transmitting mechanism, and a third member operatively connected with said second selectively engageable stationary torque transmitting mechanism;

a simple planetary gear set having a first member operatively connected with both said first and second selectively engageable rotating torque transmitting mechanisms, a second member continuously drivingly connected with said output shaft, and a third member;

a selectively operable mechanical clutch mechanism having a first portion continuously connected with said third member of said compound planetary gear set and operatively connected with said second selectively engageable stationary torque transmitting mechanism, a second portion continuously drivingly connected with said input shaft, and a control portion selectively engageable individually with said first and second portions and being continuously connected with said third member of said simple planetary gear set; and said control portion being selectively engaged with said second portion during establishment of a reverse speed ratio in said transmission, being selectively engaged with said first portion during establishment of a forward speed ratio in said transmission, and being disconnected from both said first and second portions during establishment of a neutral condition in said transmission.

* * * * *